(12) United States Patent
Kawabata

(10) Patent No.: US 6,591,045 B2
(45) Date of Patent: Jul. 8, 2003

(54) OPTICAL CABLE

(75) Inventor: Saburo Kawabata, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 78 days.

(21) Appl. No.: 09/855,508

(22) Filed: May 16, 2001

(65) Prior Publication Data

US 2001/0055452 A1 Dec. 27, 2001

(30) Foreign Application Priority Data

Jun. 23, 2000 (JP) ......................... 2000-189822

(51) Int. Cl.⁷ ................................. G02B 6/44
(52) U.S. Cl. ...................................... 385/100
(58) Field of Search ................... 385/100, 104, 385/111

(56) References Cited

U.S. PATENT DOCUMENTS 5,524,164 A * 6/1996 Hattori et al. .............. 385/114

FOREIGN PATENT DOCUMENTS

JP 10-170778 6/1998

OTHER PUBLICATIONS

Co-pending related U.S. patent application Ser. No. 09/756,273, filed Jan. 9, 2001 (Our Ref. No. 50395–081).

* cited by examiner

Primary Examiner—Khiem Nguyen
(74) Attorney, Agent, or Firm—McDermott, Will & Emery

(57) ABSTRACT

The present invention related to an optical cable in which an optical fiber unit is covered with plural pieces of plastic warn and an outer covering such that the transmission characteristics of optical fibers does not deteriorate even if the plastic yarn longitudinally shrinks with time or with temperature. An optical fiber unit is covered with plural pieces of plastic yarn applied by clockwise-counterclockwise stranding.

2 Claims, 2 Drawing Sheets

FIG. 4   PRIOR ART

OPTICAL CABLE

BACKGROUND OF THE INVENTION

1. Field of the Invention

The present invention relates to an optical cable in which a plurality of optical fibers are assembled into a unit, and the unit is covered with plural pieces of plastic yarn and an outer covering.

2. Description of the Background

For protecting an optical fiber from external pressure and preventing the occurrence of micro bend loss, conventional optical cables generally have a constitution such that a plurality of optical fibers are assembled into a unit and covered with plural pieces of plastic yarn and an outer covering. In optical cables having such structure, plural pieces of plastic yarn are longitudinally applied in a straight form or wound in one direction around the assembled optical fibers. The plural pieces of plastic yarn are cushiony because they are made of a string that is formed by rolling up a thin plastic film having numerous reticulate rips. The optical cables of such structure have been used based on the view that covering the outer periphery of assembled optical fibers or an optical fiber unit with such plural pieces of plastic yarn are useful for protecting the optical fibers from the external pressure and preventing the occurrence of micro bend loss.

In other words, for the purpose of protecting the optical fibers from external pressure it was considered to be sufficient for an optical fiber unit to be entirely covered with plural pieces of plastic yarn in a manner such that the plural pieces of plastic yarn are longitudinally applied in a straight form around the optical fiber unit or wound around it in one direction.

However, in the course of using an optical cable of such structure it was found that occasionally the plural pieces of plastic yarn shrank longitudinally, causing an adverse effect. That is, when the plural pieces of plastic yarn shrink longitudinally, the optical fibers located inside thereof are thereby compressed or caused to shrink, resulting in the optical fibers to meander minutely. This leads to harmful micro bend loss and an increase of transmission loss.

The longitudinal shrinkage of the plural pieces of plastic yarn is considered to occur in the following process. The plural pieces of plastic yarn are stretched by the tension caused in the process of applying them around an optical fiber unit, thereby allowing such elongating strain to be left in the manufactured optical cable. The plural pieces of plastic yarn thus stretched would shrink over time or depending on the variation of ambient temperature after the cable is manufactured. As a result, there occurs an adverse effect such that the transmission loss of the optical fiber changes with time or according to such variation of ambient temperature, rendering the optical cable to have unstable characteristics.

A conceivable method of preventing such adverse effects is to produce a cable without affording such elongating strain to the plural pieces of plastic yarn. However, the plastic yarn used for the above-mentioned purpose is generally made of thin polypropylene yarn and plural pieces thereof are applied around an optical fiber unit such that the weight of a cable as well as its cost is decreased. Such thin polypropylene yarn has a small Young's modulus and tends to stretch easily. Though thick polypropylene yarn does not tend to stretch easily, there is a limit in terms of allowable volume within a given diameter of the optical cable such that a small number of pieces of thick polypropylene yarn cannot cover an optical fiber unit completely and uniformly. Consequently, the optical fibers are subject to uneven lateral pressure and increased transmission loss. Therefore, a structure using such a small number of thick polypropylene yarns must be avoided. It is advantageous to use thin polypropylene yarn having a small Young's modulus for such plural pieces of plastic yarn, and in order to manufacture a cable without causing elongating strain, it would be necessary to supply the plural pieces of plastic yarn at an extremely low tension during the manufacturing process of the cable. Such tension must be less than the tension that is given to the optical fibers, and supply-equipment in which such a low tension can be precisely controlled is very high-cost. An optical cable manufactured with such expensive equipment would itself also be very high-cost.

Using other kinds of protective material having a high Young's modulus would allow a rough tension control.

Such a material, however, would be high-cost, and the optical cable consequently would be expensive.

FIG. 4 is a perspective view showing an example of a conventional optical cable. An optical fiber unit 3 is composed of a tension member 2 and a plurality of optical fibers 1 assembled therearound. The optical fiber unit 3 is covered with plural pieces of plastic yarn 4 assembled thereon. Then, they are covered completely with an outer covering 5.

In order to prevent the bend strain from concentrating on particular optical fibers of the optical fiber unit 3 when an optical cable having such composition is bent, the whole of the optical fiber unit 3 is twisted in one direction. In the example shown in FIG. 4, the optical fiber unit 3 is covered with plural pieces of plastic yarn 4 twisted in one direction. If the plural pieces of plastic yarn 4 shrink longitudinally in the optical cable of such structure, the plural pieces of plastic yarn 4 will thereby have an adverse effect on the optical fiber unit 3 located inside thereof, which will cause each of optical fibers 1 to meander minutely because of longitudinal shrinkage or lateral compression, and consequently harmful micro bend loss will occur.

If plural pieces of plastic yarn 4 are longitudinally applied onto the optical fiber unit 3 in a straight form such as a straight line instead of twined application, the plural pieces of plastic yarn 4 will not laterally compress the optical fiber unit 3. However, even in this case, if the plural pieces of plastic yarn 4 shrink longitudinally, they will have an adverse effect on the optical fiber unit 3, such that the optical fibers 1 will be caused to meander minutely, resulting in increased harmful loss.

As described above, cases were found wherein plural pieces of plastic yarn, which were used to prevent micro bend loss due to the lateral pressure from the outside, shrank and themselves caused micro bend loss. The importance of managing the longitudinal expansion and shrinkage of optical fibers 1 has been recognized in the past. For example, it is described in Japanese Patent Application Laid-Open No. 10-170778, although the purpose is different from that of the present invention.

SUMMARY OF THE INVENTION

An object of the present invention is to solve the above-mentioned problem of the conventional technique economically, and to provide an optical cable having stable characteristics such that its transmission characteristics do not exhibit change with time or with temperature. The primary feature of an optical cable according to an embodiment of the present invention is that it is formed by covering the circumference of an optical fiber unit with plural pieces of plastic yarn in a manner such that the plural pieces of plastic yarn are stranded in alternating clockwise and counter-clockwise directions and coarsely bound with a winding string, and then covered with an outer covering.

Here, such clockwise-counterclockwise stranding is a means of twining in which the following stranding operation is repeated; such stranding sometimes being called "SZ stranding." That is, a bundle of linear materials is stranded in one direction and the stranding direction is reversed at a predetermined longitudinal interval, and then the stranding direction is again reversed to the initial direction at the same longitudinal interval. Here, a "predetermined longitudinal interval" is called the "reverse-turning pitch" and an "angle formed by such twining until the stranding direction is reversed" is called the "reverse-turning angle."

There are various means and, ways of clockwise-counterclockwise stranding: in some cases the reverse-turning angle is large such that more than one round of twisting is performed for each reverse-turning, and in other cases the reverse-turning angle is very small such that the stranding is achieved only by meandering slightly.

Another feature of an optical cable according to an embodiment of the present invention is that the reverse-turning pitch of clockwise-counterclockwise stranding of plural pieces of plastic yarn is 100 mm or more but not exceeding 200 mm, and the reverse-turning angle is 180 degrees or more but not exceeding 360 degrees.

BRIEF DESCRIPTION OF THE DRAWINGS

FIG. 4 is a perspective view of an example of a conventional optical cable.

DETAILED DESCRIPTION

Figure 1:
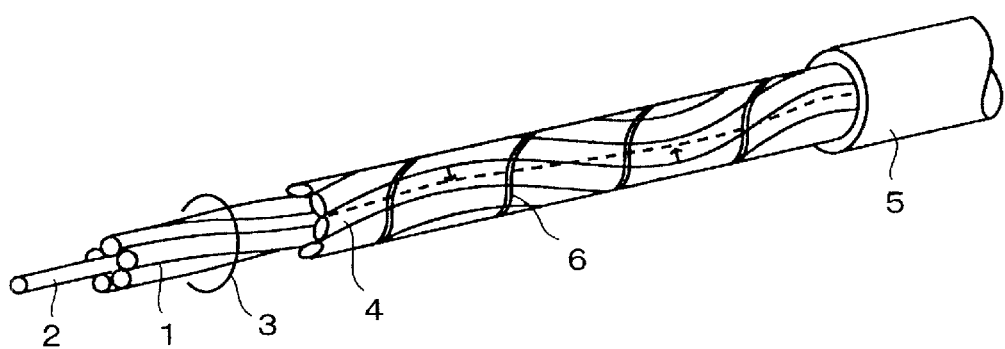
FIG. 1 is a perspective view of the composition of an optical cable according to an embodiment of the present invention.

In the following, a detailed explanation of the embodiments of the present invention will be given with reference to the accompanying drawings. To facilitate the comprehension of the explanation, the same reference numerals denote the same parts, where possible, throughout the drawings, and a repeated explanation will be omitted. The dimensions in the drawings are partly exaggerated and do not always correspond to actual ratios of dimensions.

FIG. 1 is a perspective view of an example of the present invention. As shown in FIG. 1, a plurality of optical fibers 1 are assembled around a tension member 2 so as to form an optical fiber unit 3, and plural pieces of plastic yarn 4 are applied around the optical fiber unit 3 by clockwise-counterclockwise stranding.

The numeral 6 indicates a binding string that is applied by coarse-winding on the outer periphery of plural pieces of plastic yarn 4. The term "coarse-winding" as used herein means "winding method in which the length of one winding pitch is more than several times of the outer diameter of the winding string or the width of the winding tape." Therefore, the plural pieces of plastic yarn 4 that are subjected to clockwise-counterclockwise stranding are fastened to the optical fiber unit 3 only at the part that touches the binding string 6 for coarse-winding.

In the case of an optical cable having the structure according to the present invention, even if the plastic yarn 4 shrinks over time or according to the temperature variation, the plastic yarn 4 can shrink without adversely affecting the optical fiber unit 3 as described below, such that it does not cause any harmful strain to the optical fibers 1. When the plural pieces of plastic yarn 4 that are stranded in clockwise-counterclockwise stranding shrink, the meandering of clockwise-counterclockwise stranding becomes moderate, and thus less curved. The broken line in FIG. 1 shows the meandering of a piece of plastic yarn of the clockwise-counterclockwise stranding that has become moderate and nearly straight line as a result of the shrinkage of the plastic yarn to become less curved.

Thus, in the case of an optical cable having the structure according to the present invention, the transmission characteristics of the optical fibers are stable because the plural pieces of plastic yarn are allowed to shrink without adversely affecting the optical fiber unit inside them.

In other words, because the shrinkage of the plural pieces of plastic yarn is no longer harmful, the plural pieces of plastic yarn being subjected to elongating strain during the manufacture of an optical cable is not a problem. Therefore, for supplying plural pieces of plastic yarn with high tension may be applied during manufacture of an optical cable, and hence it is unnecessary to provide a delicate tension control. Consequently, this enables the equipment for supplying plural pieces of plastic yarn to be low-cost, and a cost-effective optical cable having stable characteristics to be manufactured.

Figure 2:
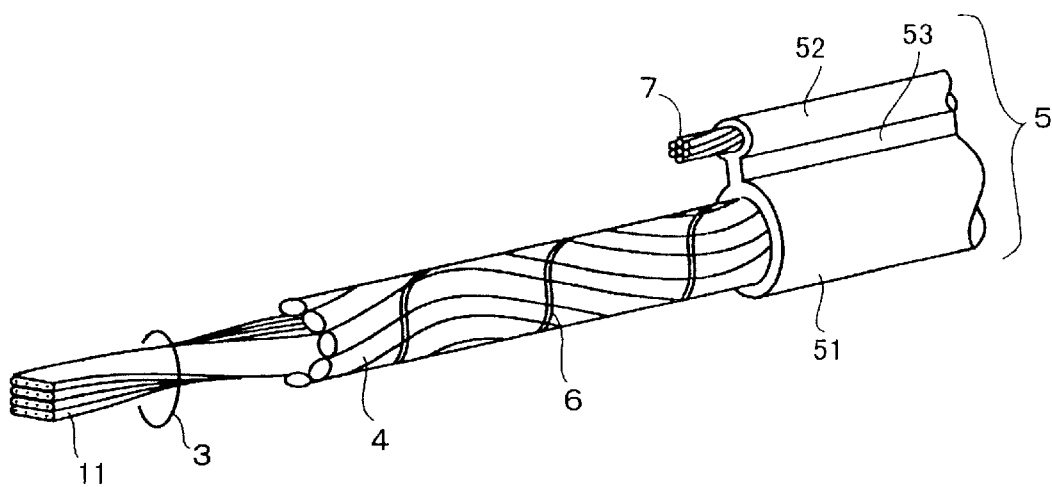
FIG. 2 is a perspective view of an example of an optical cable according to the present invention.

Another example of an optical cable according to an embodiment of the present invention is shown in FIG. 2. In FIG. 2, an optical fiber unit 3 is made of four 4-core fiber ribbons 11 stacked together, each of which is of a tape-shaped form by arranging four optical fibers in parallel and coating them altogether. In order to prevent the bending strain from concentrating on a specific optical fiber when an optical cable is bent, the entire optical fiber unit 3 is twisted in one direction. The cycle (pitch) of the twisting is 250 mm.

Ten pieces of polypropylene yarn of 4000 deniers are applied around the optical fiber unit 3 by clockwise-counterclockwise stranding as plural pieces of plastic yarn 4. A binding string 6 is coarsely wound around the outer periphery of the plural pieces of plastic yarn 4 to maintain the clockwise-counterclockwise stranding condition of the plural pieces of plastic yarn 4 is maintained.

The numeral 5 indicates an outer covering for over-head use, which is made of polyethylene formed in a figure-8 shape. The outer covering 5 is composed of a main body part outer covering 51 and support wire part outer covering 52, which are connected to neck part 53. Steel stranded wire 7, which functions as a support wire for over-head use, is incorporated inside the support wire part outer covering.

If the steel stranded wire 7 is provided inside the optical fiber unit 3, as in the case of the tension member 2 of FIG. 1, it can perform the function of suppressing the longitudinal shrinkage of the optical fiber unit. However, in an optical cable with the structure shown in FIG. 2, the steel stranded wire 7 is apart from the optical fiber unit 3 because of the neck part 53, and there is no tension member inside the optical fiber unit 3, that is, there is no nearby member that can suppress the longitudinal shrinkage of the optical fiber unit.

Therefore, in the case of an optical cable having the structure shown in FIG. 2, it would be a matter of concern that the longitudinal shrinkage of the optical fiber unit would tend to occur more easily than in the case of the optical cable having the structure shown in FIG. 1, and that consequently the variation of the transmission characteristics due to the above-mentioned reason would also easily occur. However, as a result of the plural pieces of plastic yarn 4 being provided by clockwise-counterclockwise stranding, the transmission characteristics were very stable as will be described later.

As for the optical cable shown in FIG. 2, the plural pieces of plastic yarn used therein were made of polypropylene yarn of 4000 deniers, and the strand radius of one piece of yarn was about 2 mm. Then, the ten pieces of yarn were respectively stranded by clockwise-counterclockwise stranding at a reverse-turning angle of 180 degrees, and at a reverse-turning pitch of 100 mm. A nylon thread was used as a binding string 6 for coarse-winding, and the pitch of the coarse-winding was 20 mm.

Figure 3:
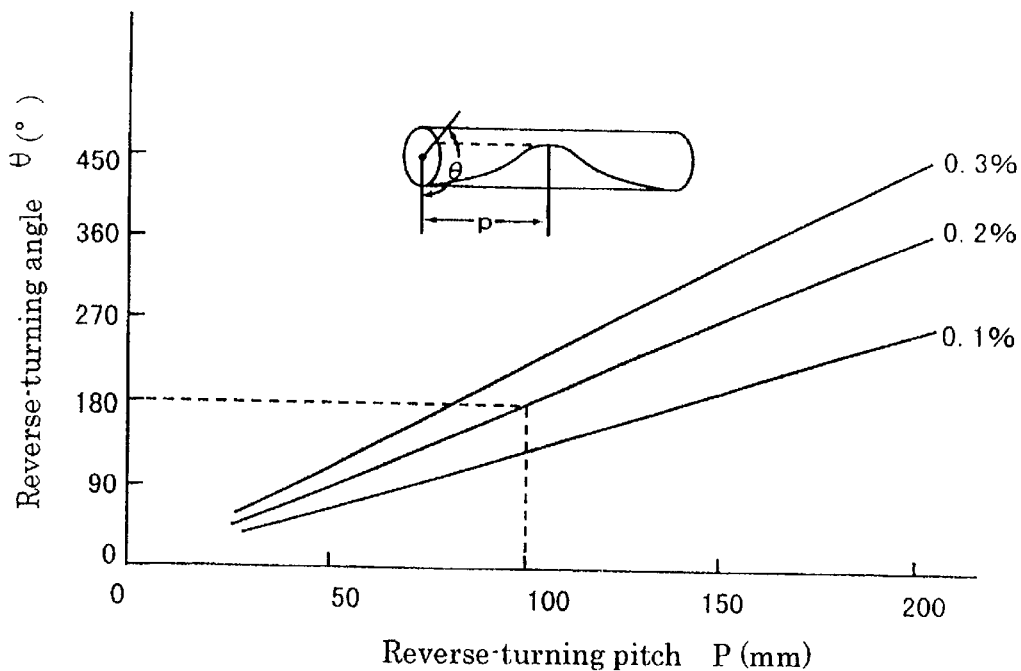
FIG. 3 is a graph showing an effect of the present invention.
Figure 3:
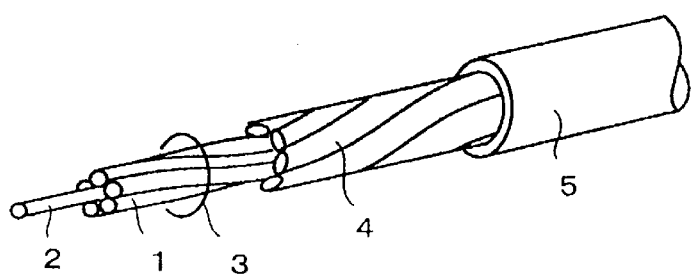

When the reverse-turning angle and the reverse-turning pitch of the plastic yarn to be stranded by clockwise-counterclockwise stranding are determined by calculation so that the length of plastic yarn may become 0.1%, 0.2% or 0.3% longer than the cable length, and the combination of the coordinates of the reverse-turning angle and the reverse-turning pitch is plotted for excess length of 0.1%, 0.2%, and 0.3%, respectively, plotting a reverse-turning angle in ordinate and a reverse-turning pitch in abscissa, each plotted line becomes a straight line as shown in FIG. 3. Conversely, when a reverse-turning angle and a reverse-turning pitch are determined, the amount of the excess length can be estimated from FIG. 3.

For example, when the reverse-turning angle is 180 degrees and the reverse-turning pitch is 100 mm, it is found from FIG. 3 that the plastic yarn becomes 0.2% longer than the cable length. If the plastic yarn is 0.2% longer than the cable length and the shrinkage of the plastic yarn is equal to or less than 0.2%, the plastic yarn can shrink without adversely affecting on the optical fiber unit 3, only allowing the meandering of the plastic yarn due to clockwise-counterclockwise stranding to become moderate and close to a straight line. However, this is an ideal case according to calculation. Actually, it is considered to be difficult to cause the plastic yarn to shrink until it becomes a straight line without having any adverse effect on the optical fiber unit 3 because there is an effect of ambient factors such as the frictional force with the coarse-winding string.

According to an actual measurement by an experiment, with a supply tension of 300 g each for the 4-core fiber ribbon 11 and the plastic yarn 4, the elongation of the plastic yarn, i.e. the polypropylene yarn, was 0.17% and the elongation of the 4-core fiber ribbon was 0.08%. The polypropylene yarn is stretched only 0.09% more than the 4-core fiber ribbon. The 0.09% surplus elongation of the polypropylene yarn is a sufficiently small value as compared with the above-mentioned geometrical amount of excess length 0.2% of polypropylene yarn. It will be apparent from the following experimental result that the shrinkage that may arise with respect to the surplus elongation 0.09% does not have any adverse effect on the optical fiber.

Actually, the characteristics of the cable for experimental production shown in FIG. 2 have been excellent after the experimental production, and for a half-year period after the experimental production, there was no recognizable variation of the transmission loss. Furthermore, when a heat cycle test from −20 degrees to +50 degrees was repeated after that, there was no recognizable variation of transmission loss.

An experiment was conducted using a simple model in order to examine the possibility of plastic yarn to shrink without having an adverse effect on the optical fiber unit 3 if the meandering becomes moderate and becomes close to a straight line in form when a geometrical amount of excess length is afforded to the plastic yarn. The model was such that a silicon rubber tube having a diameter of 8 mm was longitudinally provided with one polypropylene yarn, and bound with a string by coarse-winding so as to maintain a turning-over part, which was positioned at the vicinity of a longitudinally central portion of the polypropylene yarn. This model was pulled from both ends thereof, and while the silicon rubber tube was being stretched, an observation was made to determine how close to a straight line the form of the polypropylene yarn became.

As a result, the polypropylene yarn easily became less meandering and close to a straight line until the reverse-turning angle became about ½ of the original. Further stretching the silicon rubber tube caused a slip between the tube and the polypropylene yarn and consequently prevented accurate observation and evaluation. Such result may depend on the kind of yarn, the coarse-winding tension of a binding string, and other factors. It was, however, confirmed that shrinkage to the extent of half the amount of a given geometrical excess length does not have an adverse effect on the optical fiber unit 3. Contrarily, it will be necessary to provide a geometrical excess length equal to or more than 0.2% in order to prevent the shrinkage of 0.1% from having an adverse effect on the optical fiber unit 3.

In the above-mentioned example, the surplus elongation of the polypropylene yarn was 0.09%. Actually, since it is often the case that the surplus elongation is about 0.1%, it is expected that an optical cable having stable characteristics can be obtained by allowing the plastic yarn to have a geometrical excess length of about 0.2% beforehand.

On the example shown in FIG. 2, it was, thus, preferable to have the reverse-turning angle at 180 degrees, the reverse-turning pitch at 100 mm, and to have the plastic yarn geometrically 0.2% longer than the cable length.

It is possible to achieve an excess length of 0.2% or 0.3% by choosing a reverse-turning angle and reverse-turning pitch appropriately using the straight lines shown in FIG. 3. However, in order to reduce a reverse-turning pitch to 100 mm or less, it is necessary to increase the reverse-turning frequency. This would require high-cost facilities.

On the other hand, to make the amount of excess length of 0.2% or more with a reverse-turning pitch of 200 mm or more, it is necessary to make the reverse-turning angle to 360 degrees or more as can be seen from FIG. 3. If the reverse-turning angle is 360 degrees or more, which is similar to conventional one-way stranding, it would not only damage the merit of the clockwise-counterclockwise stranding that facilitates the withdrawal of an inner optical fiber unit, but also would decrease the ratio of the plastic yarn shrinkage rate and the amount of the excess length that can allow the shrinkage of the plastic yarn without having an adverse effect on the optical fiber unit 3.

It can therefore be understood that the reverse-turning pitch is preferably from 100 mm to 200 mm, and the reverse-turning angle is preferably from 180 to 360 degrees.

As described above, the shrinkage of plastic yarn can be made harmless by applying plural pieces of plastic yarn around an optical fiber unit by clockwise-counterclockwise stranding. As a result, the transmission characteristic of the optical fibers becomes stable against the passage of time as well as a variation of temperature, and accordingly a highly reliable optical cable can be obtained. Also, such optical cable can be manufactured at low cost because expensive equipment is not required for controlling the tension to an extremely low level for supplying plastic yarn in manufacturing an optical cable.

What is claimed is:

1. An optical cable comprising an optical fiber unit covered with plural pieces of plastic yarn and an outer covering, said plural pieces of plastic yarn being applied by clockwise-counterclockwise stranding and being coarsely wound with a binding string.

2. An optical cable comprising an optical fiber unit covered with plural pieces of plastic yarn and an outer covering, said plural pieces of plastic yarn being applied by clockwise-counterclockwise stranding and being coarsely wound with a binding string; and wherein the reverse-turning pitch of said clockwise-counterclockwise stranding of said plural pieces of plastic yarn is equal to or more than 100 mm but not exceeding 200 mm, and the reverse-turning angle is equal to or more than 180 degrees but not exceeding 360 degrees.

* * * * *